United States Patent Office 3,449,204
Patented June 10, 1969

3,449,204
OLEFIN ADHESIVES, ARTICLES AND COMPOSITIONS THEREOF
Robert David Souffie, Wilmington, Del., assignor to E. I. du Pont de Nemours and Company, Wilmington, Del., a corporation of Delaware
No Drawing. Filed Feb. 17, 1964, Ser. No. 345,074
Int. Cl. B32b 25/02, 25/08; C08d 9/04
U.S. Cl. 161—243                    4 Claims This invention relates to a new solvent dispersion of an elastomer and more particularly, to adhered structures obtainable using the dispersion as an adhesive composition.

Normally solid, chain-saturated α-olefin hydrocarbon copolymers are becoming increasingly important today for making a wide variety of useful products. Many applications involve the building of compounded assemblies wherein articles made from these copolymers are positioned against each other or articles made from similar copolymers of other elastomers such as natural rubber, styrene-butadiene rubber, polybutadiene, and neoprene. A particularly important example is the joining of α-olefin copolymer tread or white wall stock to a styrene-butadiene rubber carcass in the manufacture of automobile and truck tires. When one undertakes to construct a tire from elastomeric articles having poor tack it may take up to three times as long to accomplish the fabrication as it would if relatively high-tack rubbers are used. For this reason it is apparent that a satisfactory adhesive is desired which imparts good adhesion both before and after curing. Unfortunately all the α-olefin hydrocarbon copolymers of the above defined type are rather deficient in tack, especially those of higher Mooney viscosity, for example (ML–4/212° F.) value of 85; this shortcoming makes it particularly inconvenient and uneconomical to construct a whole tire or recaps or white walls from an α-olefin hydrocarbon copolymer. The assemblies tend to come apart during construction prior to cure and require an undesirably long time on account of the repeated operations so frequently needed.

It has unexpectedly been found that articles displaying exceptional cohesive tack both before and after curing can be prepared by joining a curable α-olefin hydrocarbon copolymer article to another elastomeric article employing the novel composition of this invention which comprises a dispersion in an inert organic solvent of a chain-saturated α-olefin hydrocarbon copolymer having a Mooney viscosity (ML–4/212° F.) of from about 10 to 20.

This composition is very useful for improving the surface tack of normally-solid, curable chain-saturated α-olefin hydrocarbon copolymers, e.g., ethylene/propylene or ethylene/propylene/1,4-hexadiene copolymers having a Mooney viscosity (ML–4/212° F.) of about 85. It is merely necessary to apply a thin coating of the composition to the copolymer surface by any conventional method. When dry the coated article is ready for use. The surface is pressed against other copolymer stock which, optionally, may also have a treated surface. Thus one can readily join copolymer white wall stocks to copolymer tire carcass stocks or copolymer tread stocks to copolymer carcass stocks. The components of the composite article remain firmly fixed in position and can be cured thereafter to give adhered assemblies having a bond of satisfactory strength.

The coating composition can also be used in preparing composite articles from these α-olefin copolymers and curable conjugated diene elastomers such as natural rubber, styrene-butadiene rubber, cis-polybutadiene, cis-polyisoprene and neoprene. The adhesion of the coated copolymer stock to the conjugated diene elastomer is better than that of the untreated controls but not as effective as in the case of adhesion of α-olefin copolymers to α-olefin copolymer.

The critical component in the composition of the present invention is the curable, low-viscosity α-olefin chain-saturated hydrocarbon copolymer. If the Mooney viscosity of this copolymer is below about 10, the composition becomes too fluid to impart the desired tack. If the Mooney viscosity is above about 20, the copolymer has less tackiness and the resulting composition is less effective. The optimum Mooney viscosity for a particular copolymer can be determined by routine experiments by those skilled in the art. The ability of the copolymer to impart tack is not a function of its unsaturation. However, sulfur-curable copolymers are preferred when one prepares sulfur-cured composite articles. The low-viscosity copolymers are made from α-monoolefins and, optionally, non-conjugated dienes. The α-monoolefins have the structure R—CH=CH$_2$ where R is H or $C_1$–$C_1$–$C_{16}$ alkyl, preferably straight-chained. Representative non-conjugated dienes include: open-chain $C_6$–$C_{22}$ dienes having the structure

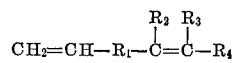

wherein R$_1$ is an alkylene radical, R$_2$, R$_3$ and R$_4$ are independently selected from the group consisting of hydrogen and alkyl radicals, dicyclopentadiene; a 2-alkyl-2,5-norbornadiene; cyclopentadiene; and 1,5-cyclooctadiene.

Representative procedures for making copolymers are given in U.S. Patents 2,933,480; 3,000,866; 3,000,867; 3,063,973; 3,093,620 and 3,093,621. When cyclic non-conjugated dienes are employed, it is preferred that the reaction mixture contain ethylene and at least one other α-monoolefin. The copolymers should contain about 20 to 75 weight percent ethylene monomers units if it is to be rubber-like.

It is believed that low-Mooney stocks made by oil extending high-Mooney stocks, for example a stock having a Mooney of 15 made from a stock having a Mooney of 100, will not be suitable. The Mooney viscosity is measured in accordance with ASTM procedure 1646–61.

The low-Mooney viscosity copolymers can be made by mechanically peptizing the high-Mooney type (e.g., those having Mooneys of 70 to 100) by applying strong shear at temperatures beginning at 125° C. It has been found that the temperature at which the shearing is applied should initially be at least 125° C. to get rapid peptization; if the temperature is significantly lower, for example 75° C., the breakdown does not occur at a satisfactory rate. The temperature for carrying out the mechanical peptization frequently ranges as high as 170–200° C. Banbury mixers, Struthers-Wells mixers and other typical internal mixers are suitable. Open mixers, such as rubber roll mills, are inefficient and not preferred.

Alternatively, the low-Mooney viscosity copolymers can be made by modifying conventional copolymerization conditions. For example, hydrogen can be introduced as described in U.S. Patent 3,051,690. Alternatively, the catalyst concentration in the reactor can be increased until the product copolymer has a Mooney viscosity low enough to be suitable for use in this invention. In general, it is preferred to use hydrogen modification because hydrogen is cheap whereas the catalyst is expensive.

In addition to the α-olefin copolymer, optional additives such as fillers and antioxidants may be present in the composition of the present invention. The ability of the copolymer to provide cohesive and adhesive tack does not depend upon the presence of a curing system; however, the latter should be supplied, except as noted hereafter, when cured adhered composite articles are desired.

The conventional metal oxides (e.g., zinc oxide) and accelerators are necessary for a sulfur cure. Since sulfur can migrate from the copolymer stock being adhered during a sulfur cure, sulfur is not a necessary component of the composition.

The low-Mooney α-olefin copolymer is often compounded with a sulfur curing system and a carbon black or mineral filler. A typical stock contains:

| | Parts by weight |
|---|---|
| Ethylene/propylene/1,4-hexadiene copolymer | 100 |
| Carbon black | 50 |
| Zinc oxide | 5 |
| Naphthenic petroleum oil | 60 |
| Sulfur | 0–2.5 |
| Tetramethylthiuram monosulfide | 1.5 |
| 2-mercaptobenzothiazole | 0.75 |

The amount and the type of filler used will depend upon the use for the particular stock and can be varied by those skilled in the art by routine experimentation. Generally, 20–300 and frequently 40–60 parts of carbon black are supplied for each 100 parts by weight of the low Mooney copolymer in order to obtain bonds of greater strength. Furnace process carbons such as SAF and HAF black are preferred; other furnace blacks such as SRF, HFM, CF and FF can also satisfactory be used. Typical suitable channel black includes EPC, MPC, HPC and CC. Thermal carbons can be employed but are not as suitable as the above-mentioned types.

In general, the total amount of material which can be present along with the α-olefin copolymer in the coating composition can be varied widely. Any amount is suitable provided it does not affect the improvement in the surface tack of the treated copolymer and the bond strength of the cured adhered assembly. The practical limits for a particular system can readily be found by routine experiments.

The coating composition can be compounded in any order. In the usual procedure all the solids are compounded on a rubber roll mill and the resulting composition is dispersed in a low volatile solvent. Alternatively, one can dissolve the low viscosity copolymer in one solvent and disperse the remaining components in one or more other solvents and then combine all of the mixtures; also, one can add all the components at one time and disperse them simultaneously. The curing agents for the low viscosity copolymer are generally not in solution, but remain well dispersed as a suspension of indefinite stability. The composition can be made at any convenient operating temperature; 20–40° C is frequently a convenient range to work in.

The inert organic liquid can be any solvent or mixture of solvents used conventionally to dissolve α-olefin hydrocarbon copolymers. The best solvent system for a particular combination of polymers can be determined by routine selection and testing. Aliphatic hydrocarbons such as n-hexane, cycloaliphatic hydrocarbons such as cyclohexane, and aromatic hydrocarbons such as benzene are representative organic liquids.

The coating composition is applied in the conventional manner familiar to those skilled in the adhesive art; brushes, rollers, swabs and the like can be employed to spread the composition across the surface being treated. The requisite thickness of a particular coating will depend somewhat on the solids content of the composition; preferably, the amount of the composition applied is sufficient to leave a dry coating about 1 to 5 mils thick. Those skilled in the art can determine by routine testing the best thickness to use for a particular application.

After the coating has been applied, the volatile solvent is allowed to evaporate. This often requires a half to two hours at 25–30° C. When the coating has dried, the coated article is ready to use. Curing when desired is accomplished by the usual procedures such as heating under pressure in the range of 10–500 p.s.i. When the assembly is press cured, the coating may be squeezed out excessively if the pressure is too high. It is, therefore, some times advantageous to apply a pressure below that at which this loss occurs, allow the cure to proceed for about 10–15 minutes, and finally restore and maintain the initially applied pressure for the remainder of the curing time.

The curing temperature used can generally be selected from those values recommended in the art for sulfur-curable α-olefin copolymers, natural rubber or styrene-butadiene rubber. Temperatures generally range between about 130 and 160° C. with about 150 to 160° C. being preferred. Cure times will range between about 15 to 45 minutes. The time will vary inversely with the temperature, higher temperatures usually requiring shorter cure times. Those skilled in the art can determine the best time by routine testing taking into account such factors as the conditions recommended in the art for the particular curing system being used.

The sulfur curing system which can be present in the novel adhesive composition contains a metal oxide, a curing accelerator and optionally sulfur. About 0.2 to 2, preferably 0.75 to 2 parts of sulfur are present for every 100 parts by weight of the α-olefin copolymer. Concentrations above 2 parts are usually unnecessary. The concentration of the metal oxide is important since it, in conjunction with sulfur and accelerator, controls the ultimate state of bonding. At concentrations of 3 to 10 parts by weight of metal oxide (preferably, zinc oxide) per 100 parts by weight of the copolymer, the rate and state of cure are very satisfactory. Concentrations below 2 parts per 100 are sometimes less satisfactory for developing and maintaining adequate vulcanizate properties and concentrations above 10 parts per 100 are generally unnecessary. The best accelerators for the vulcanization are also the ones used for curing natural rubber. The most active accelerators include 2 - mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyldithio carbamic acid; the piperidine salt of pentamethylene-dithiocarbamic acid; 2-mercaptothiazoline; 2-mercaptobenzothiazole; N,N-diethyl-thiocarbamyl-2-mercaptobenzothiazole, and 2,2'-dithio-bisbenzothiazole. A representative and preferred accelerator includes tellurium diethyldithiocarbamate (1.5 parts) or tetramethyl-thiuram disulfide (0.75 part). Those skilled in the art can select by routine empirical experiments the best combinations of accelerators when curing a particular assembly. In addition to the above-described components, the novel composition may include such optional components as conventional antioxidants.

The elastomers being adhered by the novel composition of the present invention must be compounded with appropriate curing agents. Thus, peroxide or any of the above-described sulfur curing systems can be added to the α-olefin hydrocarbon copolymer containing side-chain unsaturation (e.g., ethylene/propylene/1,4-hexadiene). The conjugated diene elastomers can be compounded according to the well-known recipes in the art for sulfur curing natural rubber and styrene-butadiene rubber and the like. It is to be understood that various modifications of the sulfur curing procedures may be employed depending upon the stock. Various procedures and modifications of sulfur curing are more particularly described in Encyclopedia of Chemical Technology, Kirk and Othmer, published in Inter-science Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, David and Blake, published by Reinhold Publishing Corp., New York, 1937, chapter 6; Introduction to Rubber Technology, edited by M. Morton, Reinhold Publishing Corp., New York, 1959, pages 93–129; The Applied Science of Rubber, edited by W. J. S. Nauton, Edward Arnold, Ltd., London, 1961, pages 346–413, 992–1099.

As previously stated the adhesive composition of this invention is excellent for adhering articles made from any of the normally-solid high-Mooney α-olefin hydrocarbon copolymers described hereinabove from which the low-Mooney copolymers may be derived. Preferred are those with Mooney viscosities (ML–4/100° C.) above about 40, particularly above about 70. The adhesive is also excellent for joining articles of the high-Mooney α-olefin copolymers to articles made from conventional conjugated diene rubbers, e.g., natural rubber, SBR, acrylonitrile-styrene rubber, 1,4-polybutadiene, cis-1,4-polyisoprene and the like.

The invention will now be described with reference to the following examples of specific embodiments thereof wherein parts and percentages are by weight unless otherwise specified.

EXAMPLE I (A) Preparation of adhesive composition (1) Preparation of low-Mooney α-olefin copolymer component.—A low-Mooney α-olefin copolymer is made by mechanically peptizing a high-Mooney copolymer as follows. An ethylene/propylene/1,4-hexadiene copolymer having a Mooney viscosity (ML–4/100° C.) of about 85 and the approximate monomer unit composition of 52% ethylene, 44% propylene and 4% 1,4-hexadiene is prepared in tetrachloroethylene with a diisobutylaluminum chloride/vanadium oxytrichloride catalyst in accordance with the teachings of U.S. Patent 2,933,480. This high-Mooney copolymer is mechanically peptized to a Mooney viscosity (ML–4/100° C.) of about 16 by mastication for about 30 minutes in a Banbury mixer, initially at about 350° F. and operated at about 230 r.p.m.

(2) Preparation of the fluid adhesive.—The following ingredients are compounded on a rubber roll mill at 75–100° F. to prepare two adhesive stock materials I(A) and I(B):

| Ingredient | Parts I(A) | Parts I(B) |
|---|---|---|
| Low-Mooney Component of (1) above | 25 | 25 |
| Chlorinated Paraffin | None | 2.5 |
| Zinc Oxide | 1.25 | 1.25 |
| HAF Carbon Black | 12.5 | 12.5 |
| Petroleum Oil + | 10 | 10 |
| Sulfur | 0.43 | 0.43 |
| Tetramethyl thiuram monosulfide | 0.38 | 0.38 |
| 2-mercaptobenzothiazole | 0.19 | 0.19 |

+This naphthenic petroleum oil (commercially available from Humble Oil and Refining Company as "Flexon 765"), has a flash point of 445° F., a specific gravity (60/60° F.) of 0.8980, a Sabolt viscosity (212° F.) of 58 seconds, a viscosity gravity constant of 0.834, 0% N-bases, 1.5% first acidaffins, 28.3% second acidaffins, 70.2% paraffins, 0% aromatic carbon atoms, 45% naphthenic carbon atoms and 55% paraffinic carbon atoms.

Two fluid adhesives are prepared by adding 30 grams of each of the above stocks (in the form of 1 x 4 x 0.2-inch strips) to 80 grams of benzene in a jar containing porcelain balls. The jar is then rotated for at least 36 hours at 25–30° C. until a smooth dispersion is obtained.

(B) Preparation of tread, carcass, and white-wall stocks (1) Stocks all principally based on high-Mooney α-olefin hydrocarbon copolymer are prepared by compounding the following ingredients on a rubber roll mill at 75–100° F.:

| Ingredient | Parts Tread | Parts White-Wall |
|---|---|---|
| High-Mooney α-olefin Copolymer of A(1) above | 1,000 | 950 |
| Chlorosulfonated Polyethylene [1] | 0 | 50 |
| Zinc Oxide | 50 | 50 |
| Stearic Acid | 10 | 0 |
| HAF Carbon Black | 720 | 0 |
| Super Multifex [2] | 0 | 70 |
| $TiO_2$ (rutile) | 0 | 400 |
| Naphthenic Petroleum Oil (of part (2) above) | 350 | 400 |
| 2,6-di-tert-butyl-4-phenylphenol antioxidant | 0 | 20 |
| Aquamarine Blue | 0 | 2 |
| Sulfur | 17.5 | 15 |
| Tetramethyl thiuram monosulfide | 15 | 15 |
| 2-mercaptobenzothiazole | 7.5 | 7.5 |

[1] The chlorosulfonated polyethylene (made in accordance with the procedures of U.S. Patents 2,586,363 and 2,862,917) analyzed for 1.0% sulfur and 26.5% chlorine by weight; the polyethylene before chlorosulfonation had a density of 0.96 g./cc. and a melt index of about 0.7.
[2] An ultra-fine, surface coated calcium carbonate; particle size 0.03 micron; commercially available from Diamond Alkali Co.

(2) A styrene-butadiene (SBR) carcass stock is compounded by mixing the following ingredients on a rubber roll mill at 75–100° F.:

Ingredient: Parts
SBR 1500 [3] — 400
Natural rubber (smoked sheet) — 500
Midco B [4] — 220
RPA No. 6 [5] — 5
Zinc oxide — 40
Stearic acid — 20
SRF carbon black — 430
Naphthenic petroleum oil [6] — 50
Sulfur — 22
Barak [7] — 8
2,2'-dithiobisbenzothiazole — 10

[3] A styrene/1,3-butadiene copolymer having about 23.5 weight percent styrene units, a Mooney viscosity (ML–4/100° C.) of about 46–54 and a viscosity-average molecular weight of about 270,000.
[4] Whole tire reclaim (containing SBR, natural rubber, carbon black, processing oils).
[5] Peptizing agent (active ingredient pentachlorothiophenol) commercially available from Du Pont as a light gray powder having a specific gravity of 1.79.
[6] This naphthenic petroleum oil (commercially available from Sun Oil Co. as "Circo" light process oil) has a flash point of 330° F., a specific gravity (60/60° F.) of 0.9242, a viscosity-gravity constant of 0.887, less than 15% N-bases and first acidaffins, 20% aromatic carbon atoms, 40% naphthenic carbon atoms, and 40% paraffinic carbon atoms.
[7] An activator and processing aid commercially available from Du Pont Co.; the active ingredient is dibutyl ammonium oleate; it is supplied as a liquid having a flash point of 215° F. and a specific gravity of 0.88.

(C) Preparation of uncured assemblies

A series of uncured assemblies may be prepared by brushing an even coating, about 1–5 mils thick, of the adhesive of Part A above onto the surface of the elastomer stocks (1 x 4 x 0.2-inch) and allowing it to dry (usually requiring ½ to 1 day) at 25° C. The coated stocks are then pressed together by rolling them with a 2-lb. weight 4–5 times. The weight is then removed. After about 2–5 minutes the cohesion of the resulting assembly is tested by pulling the layers apart by hand.

In the following table the tread and white-wall stocks are prepared from the high-Mooney α-olefin copolymer described in Part A(1) above and compounded as in Part B(1) above; the carcass stock is that prepared as in Part B(2) above:

TABLE I(a)

| Assembly | Coating | Cohesive Tack |
|---|---|---|
| Tread-Tread | I(A) | Very Good. |
| Do | I(B) | Excellent. |

| Assembly | Coating | Adhesive Tack |
|---|---|---|
| Tread-SBR Carcass | I(A) | Fair. |
| Do | I(B) | Do. |
| Whitewall SBR Carcass | I(A) | Good. |
| Do | I(B) | Fair. |

(D) Preparation of cured assemblies 1 x 4 x 0.2-inch slabs of high-Mooney α-olefin tread and white-wall stocks of Part B(1) and SBR carcass stock of Part B(2) are swabbed with cyclohexane and dried for about 1 hour at 25° C. Then a thick layer of the adhesive of Part A(2) is applied to one side of each copolymer slab and dried at 25–30° C. for 1 hour to give a coating 1–5 mils thick. Canvas backing is attached to the uncoated sides by means of a conventional adhesive. The assemblies, made by placing the coated sides together, are cured in a 1 x 4-inch plunger mold at 500 lb./sq. in. for 30 minutes at about 307° F. Typical resulting bond strengths are reported in Table I(b) wherein the tread and white-wall stocks are of α-olefin copolymer except as designated SBR:

TABLE I(b)

| Assembly | Coating | Peel Strength at 25° C. (lb./in.) |
|---|---|---|
| Tread-SBR Carcass | I(A) | 7 |
| White-SBR Carcass | I(A) | 9 |
| Tread-SBR Carcass | Not Coated | 0 |
| White Wall-SBR Carcass | do | 0 |

It is apparent that in bonding the α-olefin copolymer stock to the SBR stock that the presence of the adhesive composition greatly improves the peel strength of cured assemblies. In bonding one α-olefin copolymer stock to another the peel strength of cured assemblies remain very high (e.g., above 50 pli.) with or without the adhesive composition.

EXAMPLE II

(A) Preparation of adhesive composition (1) *Preparation of low-Mooney α-olefin copolymer component.*—The low-Mooney copolymer is prepared in a manner similar to that of Example I except that the starting material is a high-Mooney copolymer of same composition but with a Mooney viscosity (ML–4/250° F.) of 40. The latter is prepared using an increase in catalyst concentration. The high-Mooney copolymer is masticated for 45 minutes at 150 r.p.m. (starting at 400° F.) in a Brabender Plastograph. A low-Mooney copolymer is obtained whose viscosity (ML–4/100° C.) is about 12.

(2) *Preparation of fluid adhesive.*—Five stocks, II(A–E), are compounded on a rubber roll mill at 75–100° F. according to the following recipe:

(B) Preparation of tread, carcass and white-wall stocks

Tread and carcass stocks based on high-Mooney α-olefin copolymer are prepared on a rubber roll mill at 75–100° F. according to the following recipe:

| Ingredient: | Parts |
|---|---|
| High-Mooney copolymer of Ex. I Part A(1) | 1000 |
| Zinc oxide | 50 |
| Stearic acid | 10 |
| HAF black | 720 |
| Petroleum oil of Ex. I Part A(2) | 400 |
| Sulfur | 15 |
| Tetramethyl thiuram monosulfide | 15 |
| 2-mercaptobenzothiazole | 7.5 |
| Chlorinated paraffin (carcass stock only) | 100 |

An α-olefin copolymer white-wall stock is prepared on a rubber roll mill at 75–100° F. according to the white-wall recipe of Example I Part B(1) except that 100 parts of chlorinated paraffin are additionally employed.

A styrene butadiene (SBR) carcass stock is compounded on a rubber roll mill at 75–100° F. according to the SBR carcass recipe of Example I Part B(2) except that 0.5 part of chlorinated paraffin is included in the recipe.

(C) Preparation of uncured assemblies

Fluid adhesive coating composition II(A) is applied to the surfaces of strips of the tread, carcass, and white-wall stocks prepared above and allowed to dry overnight at 25° C. The tack of these compositions is then tested according to the procedure of Example I. All the stocks are those of α-olefin copolymer except as specifically designed SBR.

TABLE II(a)

| Assembly: | Tack |
|---|---|
| Tread-Tread | Excellent. |
| White-wall-White-wall | Excellent. |
| Tread-SBR Carcass | Very good. |
| White-wall-SBR Carcass | Very good. |
| Carcass-Carcass | Excellent. |

When adhesive compositions II(B), (C) and (D) are substituted for II(A) similar results are obtained except that the adhesive tack to the SBR carcass stocks is not quite as good. Composition II(E) gives results about equivalent to those obtained with II(A).

| Ingredient | Parts | | | | |
|---|---|---|---|---|---|
| | II(A) | II(B) | II(C) | II(D) | II(E) |
| Low-Mooney copolymer of (1) above | 25 | 25 | 25 | 25 | 25 |
| Zinc Oxide | 1.25 | 1.25 | 1.25 | 1.25 | 1.25 |
| Sulfur | 0.5 | 0.5 | 0.5 | 0.5 | 0.5 |
| Tetramethyl thiuram monosulfide | 0.4 | 0.4 | 0.4 | 0.4 | 0.4 |
| 2-mercaptobenzothiazole | 0.13 | 0.13 | 0.13 | 0.13 | 0.13 |
| Chlorinated paraffin | 0 | 2.5 | 0 | 0 | 0 |
| HAF Black | 5 | 0 | 0 | 12.5 | 12.5 |
| Petroleum Oil of Ex. I Part A(2) | 5 | 0 | 0 | 17.5 | 25 |

Coating compositions are made from these stocks by dispersing them in benzene according to the procedure of Example I. The following proportions are employed:

| Coating Composition: | Parts | |
|---|---|---|
| | Stock | Benzene |
| A, B | 25 | 70 |
| C, D, E | 50 | 70 |

When the procedure is repeated after all the coating compositions have aged for one week at 25° C., essentially the same results are obtained.

(D) Preparation of cured adhered assemblies

The assemblies prepared above with fresh coating composition are cured in a 1 x 4-inch plunger mold for 30 minutes at 307° F. at 500 p.s.i. pressure. The cured assemblies obtained exhibit the following typical peel adhesions at 25° C.:

TABLE II(b)

| Assembly | Coating | Peel Adhesion (lb./linear in.) |
|---|---|---|
| Tread, Carcass | II(A) | 17 |
| White-Wall, Carcass | II(A) | 20 |
| Tread-SBR Carcass | II(A) | 6 |
| White-Wall, SBR Carcass | II(A) | 10 |
| Tread, Carcass | II(B) | 14 |
| White-Wall, Carcass | II(B) | 15 |
| Tread, SBR Carcass | II(B) | 6 |
| White-Wall, SBR Carcass | II(B) | Not Run |
| Tread, Carcass+ | II(C) | 75 |
| White-Wall, Carcass+ | II(C) | Over 100 |
| Tread, SBR Carcas | II(C) | 10 |
| White-Wall, SBR Carcass | II(C) | 10 |
| Tread, Carcass+ | II(D) | 73 |
| White-Wall, Carcass+ | II(D) | 78 |
| Tread, SBR Carcass | II(D) | 9 |
| White-Wall, SBR Carcass | II(D) | 8 |
| Tread, Carcass+ | II(E) | Over 100 |
| White-Wall, Carcass+ | II(E) | Over 80 |
| Tread, SBR Carcass | II(E) | 5 |
| White-Wall, SBR Carcass | II(E) | 7 |

+The failure was in the stock rather than the bond.

EXAMPLE III (A) Preparation of adhesive composition (1) Preparation of low-Mooney α-olefin copolymer.—A low-Mooney copolymer is prepared in the exact same way as in part A(1) of Example I except that the high-Mooney ethylene/propylene/1,4-hexadiene copolymer is masticated in a Banbury mixer at 237 r.p.m. for 75 minutes; the mixer chamber is initially about 350° F. The low-Mooney copolymer obtained has a viscosity (ML-4/100° C.) of about 20.

(2) Preparation of fluid adhesive.—Two stocks III(A) and III(B) are made up on a rubber roll mill according to the following recipe at 75–100° C.:

| Component: | Parts by weight |
|---|---|
| Copolymer E | 100 |
| Zinc oxide | 5 |
| HAF Black | 50 |
| Naphthenic petroleum oil A | 60 |
| Tetramethyl thiuram monosulfide | 1.6 |
| Sulfur | 1 |
| 2-mercaptobenzothiazole | 0.52 |
| Chlorinated paraffin (used in recipe III(B) only) | 10 |

Two coating compositions are made by placing 25 grams of 1 x 4 x 0.2-inch slabs of compounded stock in a glass jar containing porcelain balls and 50 grams of tetrachloroethylene, and then agitating the jar on a set of moving rollers at 75° F. for 48 hours. The smooth compositions contain about 33.3% solids (15.2% copolymer).

(B) Preparation of uncured assemblies

One coating is applied to the surface of articles made from each of the high-Mooney α-olefin copolymer tread, white-wall and carcass stocks of Example II and assemblies are prepared and tested as described in Example I. The table which follows gives typical results.

TABLE III(a)

| Assembly | Coating | Cohesive Tack |
|---|---|---|
| Tread to carcass | III(A) | Very Good. |
| White-Wall to carcass | III(A) | Do. |
| Tread to carcass | III(B) | Do. |
| White-Wall to carcass | III(B) | Do. |
| Tread to carcass+ | III(B) | Do. |

+The last stock is make by applying the adhesive only to the tread stock.

(C) Preparation of cured assemblies

Compositions III(A) and III(B) are applied to 1 x 4 x 0.2-inch strips of the high-Mooney α-olefin copolymer tread, white-wall and carcass stocks in accordance with the general directions of Example I. The coated stocks obtained on drying are assembled and press-cured in a 1 x 4-inch plunger mold for about 30 minutes at 317° F. at 500 lbs./sq. in. pressure. The table which follows gives typical bond strengths.

TABLE III(b)

| Copolymer A Assembly | Coating | Peel Adhesion at (25° C.) | (100° C.) |
|---|---|---|---|
| Tread, Carcass | III(A) | 115 | 58 |
| White-Wall, Carcass | III(A) | 90 | 6 |
| Tread, Carcass | III(B) | 114 | 42 |
| White-Wall, Carcass | III(B) | 85 | 5 |

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. An adhered, uncured composite assembly displaying exceptional cohesive tack comprising a pair of elastomeric articles, at least one of which articles being prepared from a copolymer of ethylene, propylene and an open-chain non-conjugated $C_6$–$C_{22}$ hydrocarbon diene having a Mooney viscosity (ML-4/212° F.) of more than about 40, said articles having contacting surfaces joined together by a dried layer of a sulfur-curable composition comprising a dispersion of (1) 100 parts of a copolymer of ethylene, propylene and a non-conjugated $C_6$–$C_{22}$ hydrocarbon diene having a Mooney viscosity (ML-4/212° F.) of from about 10 to 20, (2) from about 20 to 300 parts of carbon black, (3) from about 0.2 to 2 parts of sulfur, and (4) from about 3 to 10 parts of a metal oxide, in an inert organic solvent for said copolymer.

2. An adhered, cured composite article comprising the assembly of claim 1 subjected to curing conditions in the presence of a suitable curing system.

3. An adhered, uncured assembly displaying exceptional cohesive tack comprising (I) a sulfur-curable article of an ethylene, propylene, 1,4-hexadiene elastomer having a Mooney viscosity (ML-4/212° F.) of at least about 70, having a surface thereof joined to a contacting surface of (II) a second sulfur-curable article of an elastomer selected from the group consisting of (a) natural rubber, (b) styrene-butadiene rubber, (c) cis-polybutadiene, (d) cis-polyisoprene, (e) neoprene, and (f) an ethylene, propylene, 1,4-hexadiene elastomer having a Mooney viscosity (ML-4/212° F.) of at least about 70, by (III) a dried layer of a sulfur-curable composition comprising a dispersion of (1) 100 parts of a copolymer of ethylene, propylene and 1,4-hexadiene having a Mooney viscosity (ML-4/212° F.) of from about 10 to 20, (2) from about 20 to 300 parts of carbon black, (3) from about 0.2 to 2 parts of sulfur, and (4) from about 3 to 10 parts of a metal oxide, in an inert organic solvent for said copolymer.

4. An adhered, cured composite article comprising the assembly of claim 3 subjected to curing conditions in the presence of a suitable curing system.

References Cited

UNITED STATES PATENTS 3,364,155   1/1968   Souffie _____ 260—4

JOSEPH L. SCHOFER, *Primary Examiner.*

ROGER S. BENJAMIN, *Assistant Examiner.*

U.S. Cl. X.R.

156—334; 161—253, 254; 260—34.2, 79.5, 80.78, 41.5